(12) United States Patent
Palmert et al.

(10) Patent No.: US 10,866,959 B2
(45) Date of Patent: Dec. 15, 2020

(54) DEBUG TRACING OF NEXT BEST ACTION STRATEGY ENGINE

(71) Applicant: salesforce.com, inc., San Francisco, CA (US)

(72) Inventors: Joel Ragnar Palmert, Stockholm (SE); Greg Smolyn, Vancouver (CA); Matthew Van Wely, Lake Stevens, WA (US); Glyn Able Burton, Norfolk (GB); Martin Holladay, Bremerton, WA (US); Michael Coughlin, Vancouver (CA); Amar Gajanan Deogirikar, London (GB); Caroline Joan Liu, Vancouver (CA); Alex Edelstein, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 103 days.

(21) Appl. No.: 16/137,353

(22) Filed: Sep. 20, 2018

(65) Prior Publication Data
US 2020/0097588 A1 Mar. 26, 2020

(51) Int. Cl.
| | | |
|---|---|---|
| *G06F 7/00* | (2006.01) | |
| *G06F 16/2458* | (2019.01) | |
| *G06F 16/25* | (2019.01) | |
| *G06F 16/22* | (2019.01) | |
| *G06N 20/00* | (2019.01) | |

(52) U.S. Cl.
CPC ...... *G06F 16/2465* (2019.01); *G06F 16/2246* (2019.01); *G06F 16/252* (2019.01); *G06N 20/00* (2019.01)

(58) Field of Classification Search
CPC .......... G06F 16/2443; G06F 16/24573; G06F 16/284; G06F 9/4488; G06F 9/252; G06F 16/2465; G06F 16/2246; G06N 20/00
USPC .................................. 707/600–899
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

OTHER PUBLICATIONS

U.S. Appl. No. 15/190,554, filed Jun. 23, 2016, Palmert.

(Continued)

*Primary Examiner* — Isaac M Woo
(74) *Attorney, Agent, or Firm* — Weaver Austin Villeneuve & Sampson LLP

(57) ABSTRACT

Disclosed are some implementations of systems, apparatus, methods and computer program products for facilitating the debug tracing of a Next Best Action (NBA) strategy engine. During debug tracing, a user may interact with a user interface representing execution of the NBA strategy engine. Upon interacting with a node representing a decision point, a corresponding ordered list of options generated by the NBA strategy engine and a set of time values resulting from execution of the corresponding segment of the NBA strategy engine are provided for display in proximity to the node.

22 Claims, 8 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,075,766 B2 | 7/2015 | Palmert et al. |
| 9,292,589 B2 | 3/2016 | Palmert et al. |
| 9,400,840 B2 | 7/2016 | Palmert et al. |
| 9,465,828 B2 | 10/2016 | Palmert et al. |
| 9,607,090 B2 | 3/2017 | Palmert et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |

(56) References Cited

U.S. PATENT DOCUMENTS

| | | |
|---|---|---|
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0019544 A1 | 1/2014 | Palmert et al. |
| 2014/0067814 A1 | 3/2014 | Palmert et al. |
| 2014/0207506 A1 | 7/2014 | Palmert et al. |
| 2014/0207777 A1 | 7/2014 | Palmert et al. |
| 2014/0207801 A1 | 7/2014 | Palmert et al. |
| 2014/0289231 A1 | 9/2014 | Palmert et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0104067 A1 | 4/2016 | Xu et al. |
| 2016/0292194 A1* | 10/2016 | Farkash ............... G06F 16/221 |
| 2017/0046407 A1 | 2/2017 | Palmert et al. |

OTHER PUBLICATIONS

U.S. Appl. No. 15/847,766, filed Dec. 19, 2017, Weinhold et al.

"Google Plus Users", Google+Ripples, Oct. 31, 2011 [retrieved on Feb. 21, 2012 from Internet at http://www.googleplusers.com/google-ripples.html], 3 pages.

* cited by examiner

US 10,866,959 B2

DEBUG TRACING OF NEXT BEST ACTION STRATEGY ENGINE

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with debugging computing systems. More specifically, this patent document discloses techniques for using a central computing system to facilitate debug tracing of a next best action (NBA) engine.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them. One cloud computing service that is widely used by organizations is a Next Best Action (NBA) tool. A NBA tool analyzes available data in real-time, considers the different actions that can be taken, and selects the "best" one. A NBA engine can be useful in a number of situations including identifying a solution to a problem or recommending a new product.

BRIEF DESCRIPTION OF THE DRAWINGS

The included drawings are for illustrative purposes and serve only to provide examples of possible structures and operations for the disclosed systems, apparatus, methods and computer program products for facilitating authentication of computing system requests across tenants of a multi-tenant database system. These drawings in no way limit any changes in form and detail that may be made by one skilled in the art without departing from the spirit and scope of the disclosed implementations.

DETAILED DESCRIPTION

Figure 1:
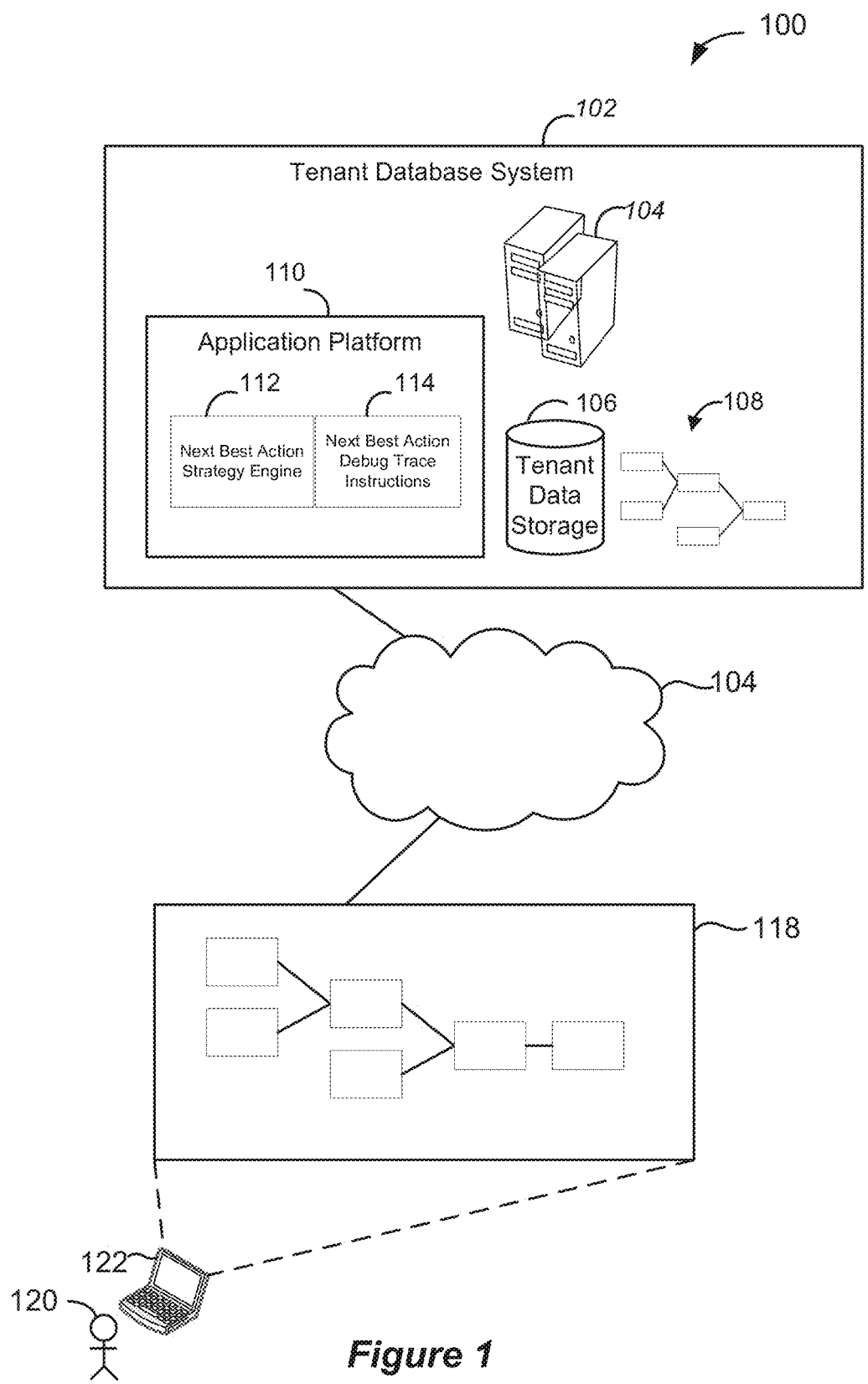
FIG. 1 shows a system diagram of an example of a system 100 in which debug tracing of a Next Best Action (NBA) engine may be facilitated, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations described or referenced herein are directed to different systems, methods, apparatus, and computer program products for facilitating debug tracing of a next best action (NBA) strategy engine, which will be referred to as a NBA engine. During debug tracing of the NBA engine, a user interface including a hierarchical representation of an instance of execution of the NBA engine may be provided for display. In some implementations, the hierarchical representation includes a plurality of nodes that each represents a corresponding code module or decision point.

In accordance with various implementations, a user may interact with a NBA engine or associated debug tool to trace results of execution of the NBA engine. In some implementations, a user may interact with one of the nodes within the hierarchical representation to view an ordered list of options generated during execution of corresponding module(s) of the NBA engine. In some implementations, a user may interact with one of the nodes within the hierarchical representation to view a set of time values pertaining to execution of the corresponding module(s) of the NBA engine.

In some implementations, a tenant database system is used to maintain data for each tenant computing system, and the tenant database system can be in the form of at least one multi-tenant database system. The tenants of the tenant database system may include various organizations of users who interact with cloud-based applications running on the tenant database system or on platform(s) associated with the tenant database system.

In database oriented computing systems and environments in which the present techniques can be implemented, the actions of users when interacting with cloud-based applications such as a NBA engine or associated debug tool may cause data to be accessed from the tenant database system, cause data to be generated and stored in the tenant database system, or cause data to be modified in the tenant database system. Non-limiting examples of system events corresponding to user activity include, by way of illustration, a login or a logout, a uniform resource identifier (URI) which may represent a page click and view, an application programming interface (API) call, a record access, a page request, or other type of system request. In some implementations, user activity may cause a system event that facilitates debugging of a NBA engine.

Some software tools offer the ability to trace execution of a NBA engine. These tools generally identify, for any given point during execution of the NBA engine, a single best option identified by the NBA engine. However, it is difficult to identify errors in a strategy or associated code implemented by the NBA engine based upon this limited information. As will be described in further detail below, various implementations provide the ability to perform debug tracing of a NBA engine while providing information that is more likely to result in the successful debugging of the NBA engine.

By way of illustration, Acme Corporation may purchase a set of tenants that facilitates managing business operations. The set of tenants store and process data such as customer data. Customer data can include, for example, customer contact information, customer orders, and cases representing issues reported by customers. In addition, the set of tenants may store information pertaining to available products such as features of each of the available products, customers that have purchased the products, issues that have been reported for the products, and steps that have been performed to resolve the issues.

An employee of Acme Corporation, Randall, works in the Sales Department. Randall is responsible for answering calls at a call center and interacting with customers to resolve any questions or issues that they have in relation to products available from Acme Corporation. Products that may be purchased from Acme Corporation include products A-K. Each of the products is a software product that offers a corresponding set of features.

Randall opens a NBA application for use in answering customer questions that he receives. Jane, an employee of XYZ, calls to inquire about products available from Acme Corporation. Randall asks Jane some questions to get information about their business and the type of product features that are of interest to XYZ. During the call, Randall submits parameters via a user interface of the NBA according to the information he receives from Jane. The NBA application generates a product recommendation for product A.

During his tenure at Acme Corporation, Randall has become familiar with the features offered by their various products. Randall is surprised by the recommendation for product A since product A does not offer one of the key features Jane identified during the call. Upon receiving the product recommendation for product A, Randall selects a trace option via the NBA application. In response, a user interface is presented that includes a hierarchical tree structure representing the execution of the NBA engine and results of the execution.

Randall may click on nodes within the hierarchical tree structure to access data that corresponds to various points during execution of the NBA engine. Randall clicks on a user interface element representing first code module(s) corresponding to a decision point of the strategy implemented by the NBA engine. Upon clicking on the user interface element, a set of data values is presented in close proximity to the user interface element. The set of data values includes a ranked list of three products: J, A, and B. In addition, the set of data values includes time values representing time that elapsed during execution of code module(s) implementing the first decision point of the strategy. The time values include: 1) a CPU time indicating an amount of time that it has taken for a processor to execute the corresponding code module(s), 2) an amount of time expended, during execution of the corresponding code module(s), to access data records of at least one database of the database system, and 3) an amount of time that has been consumed, during execution of the corresponding code module(s), to obtain additional data from one or more services offered by one or more external servers.

Randall sees that the ranking appears to be correct for this decision point corresponding to the first code module(s) executing a corresponding set of operations that generated this ranking. Randall continues to click on nodes further down into the hierarchical tree structure and locates an error in the ranking at one of the nodes. By analyzing the time values, Randall sees that the amount of time consumed to access data records is far greater than it should have been. Since there were errors accessing the database during that time, the data records could not have been accessed from the database and therefore the data used by the corresponding code module(s) to generate output for the corresponding set of operations is not correct. Randall notes that the problem is not in the strategy implemented but in the server(s) storing the database then notifies the company's IT department of a potential problem in the operation of the servers.

In accordance with various implementations, debug tracing of a NBA engine is facilitated by providing a hierarchical tree representation that corresponds to operations executed by a NBA engine while providing a set of data values for selected nodes within the hierarchical tree representation. In some implementations, a set of data values is rendered for one of the nodes responsive to an indication of a user interaction with the node. In some implementations, the set of data values includes an ordered list of options generated during execution of module(s) of the NBA engine that correspond to the node and a set of time values that pertains the execution of the corresponding module(s) of the NBA engine. The set of time values can include time value(s) associated with execution of the module(s) by internal servers that are internal to the database system. In addition, the set of time values can include time value(s) associated with operations performed by external servers that are external to the database system, as will be described in further detail below.

FIG. 1 shows a system diagram of an example of a system 100 in which debug tracing of a Next Best Action (NBA) engine may be facilitated, in accordance with some implementations. In FIG. 1, a tenant database system 102 associated with an organization includes any number of computing devices such as servers 104. The servers 104 are in communication with one or more storage mediums 106 configured to store and maintain relevant metadata used to perform some of the techniques disclosed herein, as well as to store and maintain relevant data and/or metadata generated by the techniques disclosed herein. In this example, storage mediums 106 include tenant data storage configured to store and maintain tenant data generated by or otherwise maintained by tenants of tenant database system 110. Tenant data can include, for example, database records corresponding to clients, contacts, orders, cases, etc.

Database system 102 also includes application platform 110. Application platform 110 of tenant database system 102 may be a framework that allows applications of the tenant database system 102 to run. For example, application platform 110 may include hardware and/or software, e.g., the operating system. In some implementations, application platform 110 supports the creation, managing and executing of one or more applications.

In this example, application platform 110 is configured to execute NBA strategy engine 112 and associated NBA debug tracing instructions 114 configured to support debug tracing of NBA strategy engine 112. NBA strategy engine 112 includes computer-readable instructions configured to evaluate a set of options based upon data that has been input and generate a recommended next best action. The options can include, for example, potential issues that can be identified based upon the data that has been input, solutions to a particular issue identified by the data that has been input, products, services, or offers. For example, issues can pertain to hardware, software, products, or services. Similarly, products, services, and/or offers may include or pertain to hardware, software, or a variety of products or services available from or provided by the organization. NBA strategy engine 112 may access tenant data stored in storage mediums 106, external services offered by servers external to database system 100, and/or data maintained in storage mediums outside database system 100.

In some implementations, NBA debug tracing instructions 114 are configured to obtain and/or generate data values that are stored in a hierarchical data structure 108. One or more of the data values may be obtained and/or generated by NBA debug tracing instructions 114 during execution of NBA strategy engine 112. In addition, one or more of the data values may be obtained and/or generated by NBA debug tracing instructions 114 after completion of execution of NBA strategy engine 112. Examples of data values that may be obtained or generated will be described in further detail below. In some implementations, execution of NBA debug tracing instructions 114 can be initiated responsive to an indication of a selection by a user.

While shown in this example as two separate entities, NBA strategy engine 112 and NBA debug tracing instructions 114 may be integrated into a single set of computer-readable instructions configured to execute NBA strategy engine 112, as well as support debug tracing of NBA strategy engine 112. Computer-readable instructions of NBA strategy engine 112 and NBA debug tracing instructions 114, separately or in combination, can include one or more code modules.

In this example, storage mediums 106 include hierarchical data structure 108 that stores results of executing NBA debug tracing instructions 114. In addition, hierarchical data structure 108 may store results of executing NBA strategy engine 112. An example of a hierarchical data structure and its corresponding visual representation will be described in further detail below with reference to FIGS. 2-4.

Storage mediums 106 may further store computer-readable instructions configured to perform some of the techniques described herein. In addition, the tenant storage may store metadata, data, or other information received and/or generated by a tenant as described herein.

In some implementations, tenant database system 102 is also configured to store privilege information identifying or specifying access rights and restrictions of users according to various attributes such as a specified user ID, type of user, role of user, a community to which the user belongs, and/or a particular organization on behalf of which a community is maintained. Each of the communities may be operated on behalf of an organization. Each organization may have associated therewith one or more tenants, which may each be associated with one or more communities.

In the following examples, it is assumed that a user 120 accessing NBA strategy engine 112 and associated NBA debug tracing instructions 114 via a computing device 122 has access rights to data that is generated by NBA strategy engine 112 and associated NBA debug tracing instructions 114. In addition, it is assumed that the user 140 has access rights to NBA strategy engine 112 and associated NBA debug tracing instructions 114.

During execution of NBA debug tracing instructions 114 and NBA strategy engine 112, hierarchical data structure 108 is generated and stored in storage mediums 106. A representation of hierarchical data structure 108 can be rendered as shown at 118, as will be described in further detail below.

Figure 2:
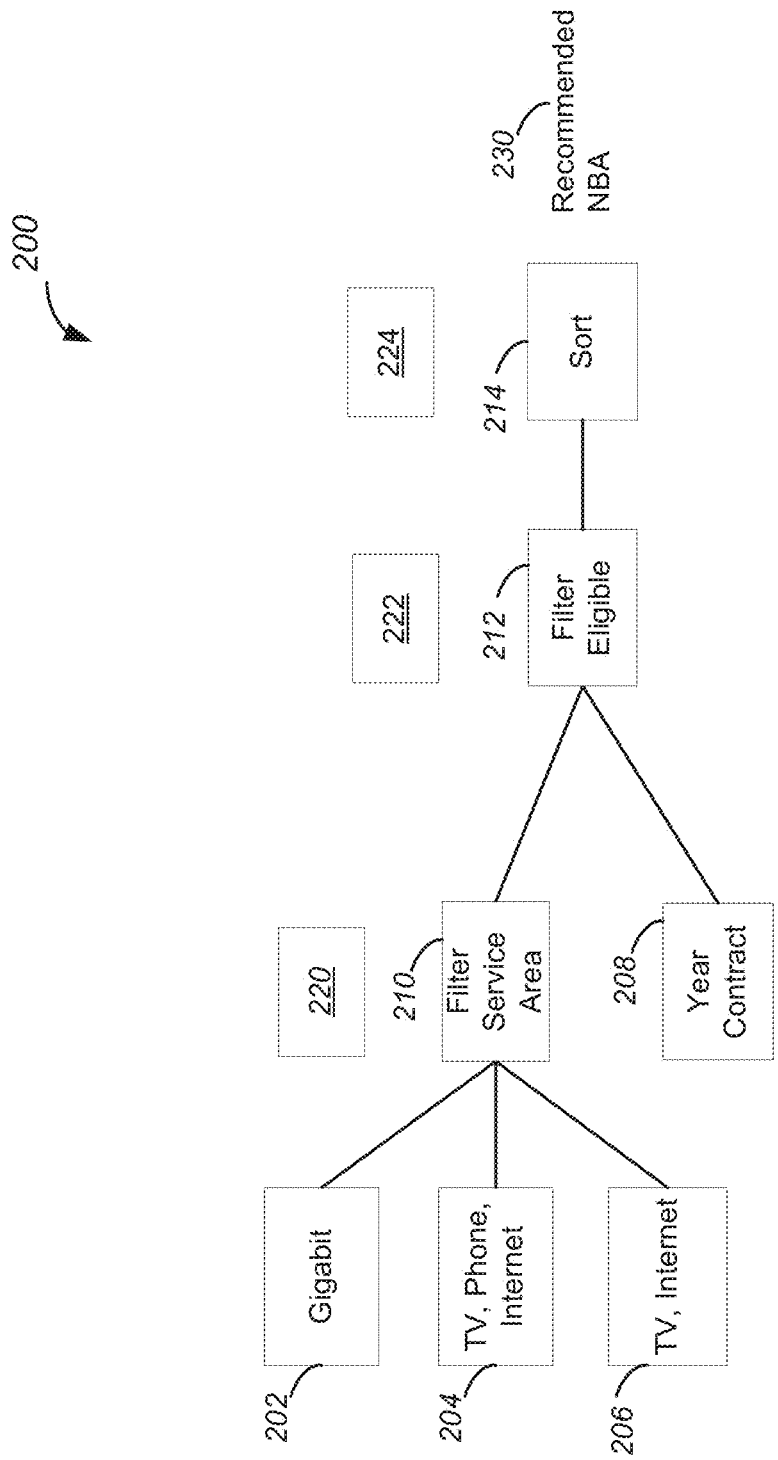
FIG. 2 shows an example of a graphical user interface (GUI) 200 for facilitating debug tracing of a NBA engine, in accordance with some implementations.

FIG. 2 shows an example of a graphical user interface (GUI) 200 for facilitating debug tracing of a NBA engine, in accordance with some implementations. The NBA engine and associated debug tracing instructions are executed such that a hierarchical data structure is generated and stored. GUI 200 includes a representation of the hierarchical data structure. The hierarchical data structure may be represented vertically or horizontally, as shown in this example. For example, the hierarchical data structure may include a tree data structure. The representation can include a plurality of nodes, which each represents one or more options being considered or an operation performed by the NBA engine.

In accordance with various implementations, the hierarchical data structure and corresponding representation mirror the order in which operations are performed during execution of the NBA engine. In this example, options that are evaluated are shown in an initial (e.g., left) segment of the representation while a recommended NBA 230 corresponding to results of the evaluation are shown in a final (e.g., right) segment of the representation.

As shown in FIG. 2, options that are evaluated can include offers. In this example, an Internet Provider has a set of offers that are evaluated based upon various factors. The set of offers includes a first set of offers including Gigabit 202, a first bundle 204 including TV, phone, and Internet, and a second bundle 206 including TV and Internet. The set of offers also includes a second set of offers including a year contract 208.

The offers are evaluated by one or more code modules of the NBA engine. Evaluation operations are represented at 210, 212, and 214. More particularly, offers 202, 204, and 206 in the first set of offers are filtered at 210 based upon service area availability. For example, Gigabit may be unavailable in some service areas that do not have wiring that supports this level of service. Next, offers identified and output by operation 210 and the second set of offers including year contract 208 are filtered at 212 based upon eligibility. For example, a customer may be ineligible for a 1 year contract if they are already in a 1 year contract with the Service Provider. A final sort operation 214 ranks the offers identified and output by operation 212. For example, offers may be ranked based upon factors such as cost, level of service, popularity, overall customer satisfaction, individual customer preferences, etc.

In accordance with various implementations, NBA debug trace instructions generate and/or obtain, for each of one or more nodes representing operations performed by the NBA engine, a set of data values pertaining to execution of the corresponding operation. More particularly, a set of data values may be generated and/or obtained on a per-node basis for a given node. This may include, for example, 1) generating and/or obtaining tracing data up to and including a particular node, 2) generating and/or obtaining tracing data starting from a first node to a second node (including one or both nodes), and/or 3) generating and/or obtaining tracing data between two different nodes (excluding both nodes). In some implementations, a user may select one of these per-node tracing options.

In some implementations, per-node tracing via NBA debug tracing instructions is initiated via an API that includes at least one node parameter that identifies a corresponding node. More particularly, the API can include a start node parameter and an end node parameter. In some implementations, user interaction with a node may trigger a call via the API to initiate tracing for a particular node. For example, a user may click on a particular node or other associated user interface element to cause NBA debug tracing instructions to be executed for the particular node. Parameters of the API may also indicate a per-node tracing option that has been selected.

As shown in this example, the set of data values for an operation may be rendered in close proximity to the corresponding node. For example, set of data values 220 associated with the service area filtering operation may be rendered in close proximity to node 210, set of data values 222 associated with the eligibility filtering operation may be rendered in close proximity to node 212, and set of data values 224 associated with the ranking operation may be rendered in close proximity to node 214. Each set of data values 220, 222, 224 may be stored in child nodes within the corresponding hierarchical data structure.

The set of data values for each of operation nodes 220, 222, 224 may be rendered simultaneously, as shown in this example. Alternatively, the set of data values may be rendered only for those operation nodes that have been selected by a user. For example, the set of data values for a node within the hierarchical representation may be provided for display in proximity to one of the operation nodes 220, 222, 224 responsive to an indication of a user selection of the node. User selection of the node can include, for example, a click of the node, hovering over the node, or other interaction with the node or associated user interface element. The representation of the node within the hierarchical representation may be associated with a URL, API, or other system call that is accessed or triggered in response to the user selection, resulting in obtaining, generating, and/or presenting a set of data values corresponding to the selected node.

Figure 3:
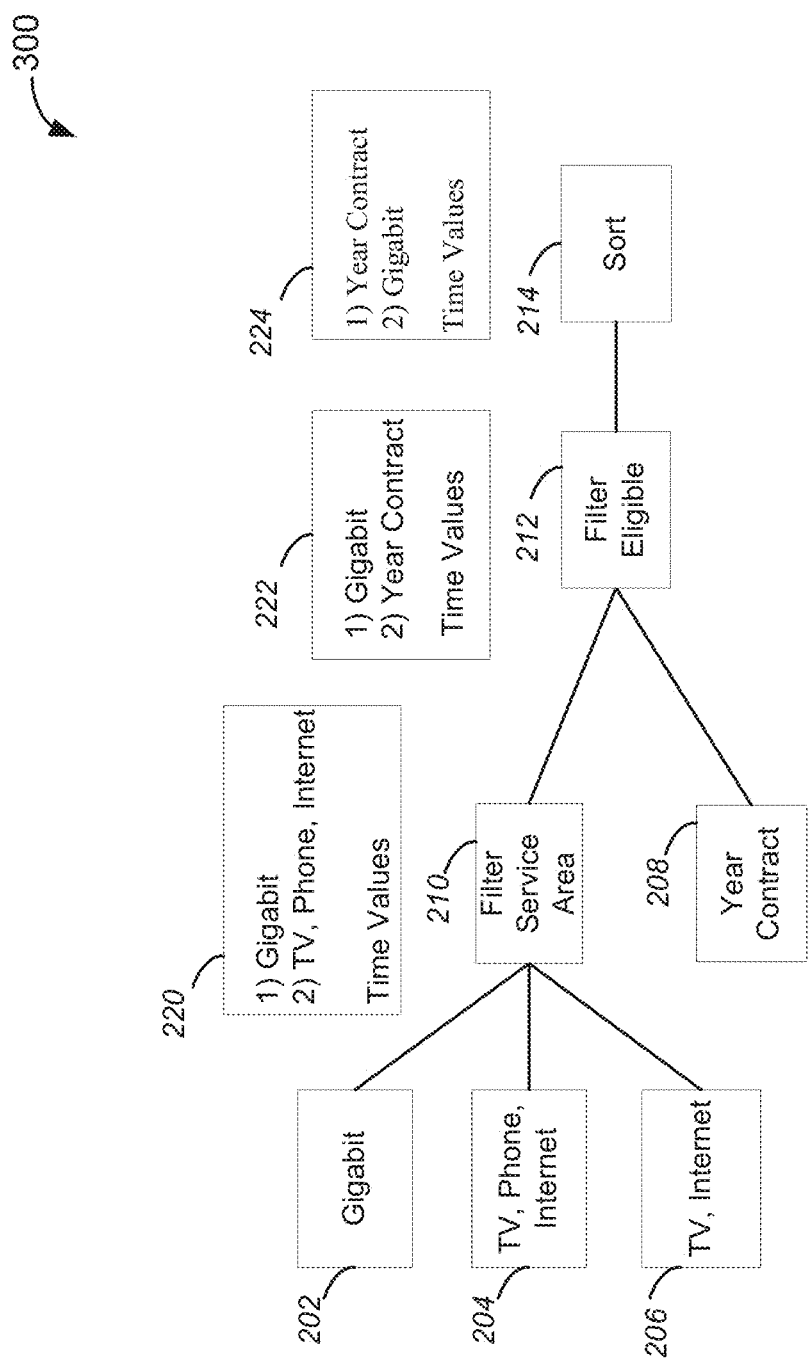
FIG. 3 shows an example of a GUI 300 for facilitating debug tracing of a NBA engine, in accordance with some implementations.

FIG. 3 shows an example of a GUI 300 for facilitating debug tracing of NBA engine, in accordance with some implementations. In this example, each set of data values 220, 222, 224 is presented within GUI 300 to illustrate the progression of the sets of data values during execution of the NBA engine and associated debug tracing instructions. In other implementations, a single set of data values may be presented for a node that has been selected by a user.

As shown in FIG. 3, each of the sets of data values 220, 222, 224 corresponding to nodes 210, 212, 214, respectively, includes a list of options that have been identified (e.g., output or generated) by corresponding code module(s) during execution of the NBA strategy engine. The list of options can include at least a subset of the options that have been evaluated by code module(s) corresponding to that node. In some implementations, the list of options includes a ranked set of options. In addition, each of the sets of data values 220, 222, 224 includes time values representing time that elapsed during execution of corresponding code module(s) of the NBA engine, as described herein.

In some implementations, during execution of the NBA engine, each of the operations such as those represented by nodes 210, 212, 214 identifies a pre-defined number of options. More particularly, code module(s) corresponding to a node may rank the options that have been evaluated and select a pre-defined number of the highest ranked options. For example, each of nodes 210, 212, 214 may identify a set of two offers.

In this example, for node 210, the set of data values 220 includes a ranked list of offers: 1) Gigabit and 2) TV, Phone, Internet. At node, 212, the set of data values 222 includes a ranked list of offers: 1) Gigabit and 2) Year Contract. Thus, the TV, Phone Internet bundle 204 has been eliminated by code module(s) corresponding to node 212 and replaced by offer Year Contract 208. For node 214, the set of data values 224 includes a ranked list of offers: 1) Year Contract and 2) Gigabit.

Figure 4:
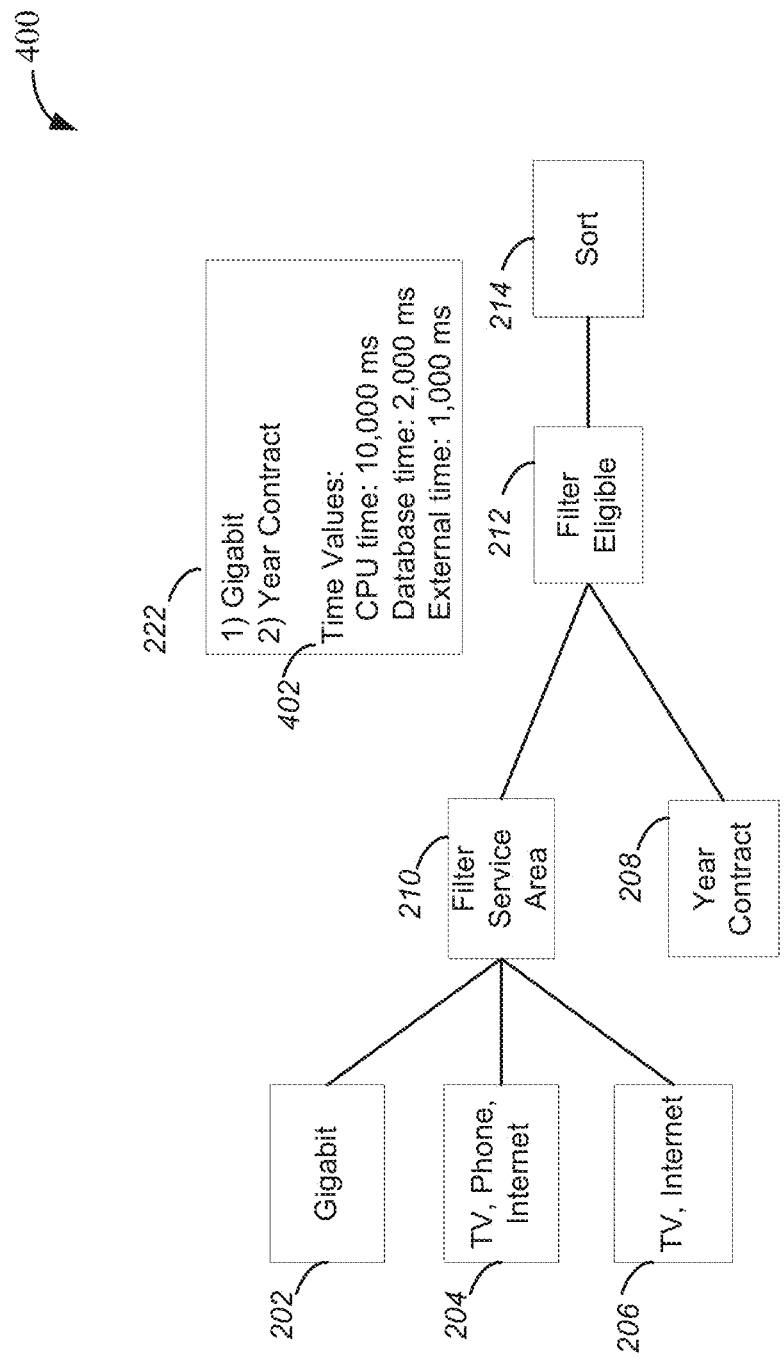
FIG. 4 shows an example of a GUI 400 for facilitating debug tracing of a NBA engine, in accordance with some implementations.

In some implementations, the set of data values for a node within the hierarchical representation is provided in response to user interaction with the node. FIG. 4 shows an example of a GUI 400 for facilitating debug tracing of a NBA engine, in accordance with some implementations. Responsive to user interaction with a user interface element corresponding to node 212 within the hierarchical representation, the debug tracing instructions provide corresponding set of data values 222 for display in close proximity to node 212. A user interface element may include a graphical element such as a box or other visual indicator.

In some implementations, the set of time values for a given node within the hierarchical representation include one or more of: 1) a CPU time specifying or indicating an amount of time that it has taken for a processor of the server(s) within the database system to execute the corresponding code module(s), 2) a database time specifying or indicating an amount of time expended, during execution of the corresponding code module(s), to access data records of at least one database within the database system, and 3) an external connection time specifying or indicating an amount of time that has been consumed, during execution of the corresponding code module(s), to obtain additional data from one or more services offered by one or more external servers external to the database system.

In this example, time values 402 of set of data values 222 include CPU time 10,000 ms, database time 2,000 ms, and external time 1,000. External time corresponds to the time that elapsed between calling an API of an external service provided by external server(s) external to the database system and the receipt of data from the external service.

The set of data values provided for a given node can be used for a variety of purposes. While the set of data values for a given node provides valuable information that can be used to debug a NBA strategy engine, the data values can also be useful in identifying issues such as hardware or software issues in servers executing the NBA strategy engine. In addition, the data values can be useful in verifying that errors in the output generated by the NBA strategy engine are caused by services offered by servers external to an organization's network and database system.

Figure 5:
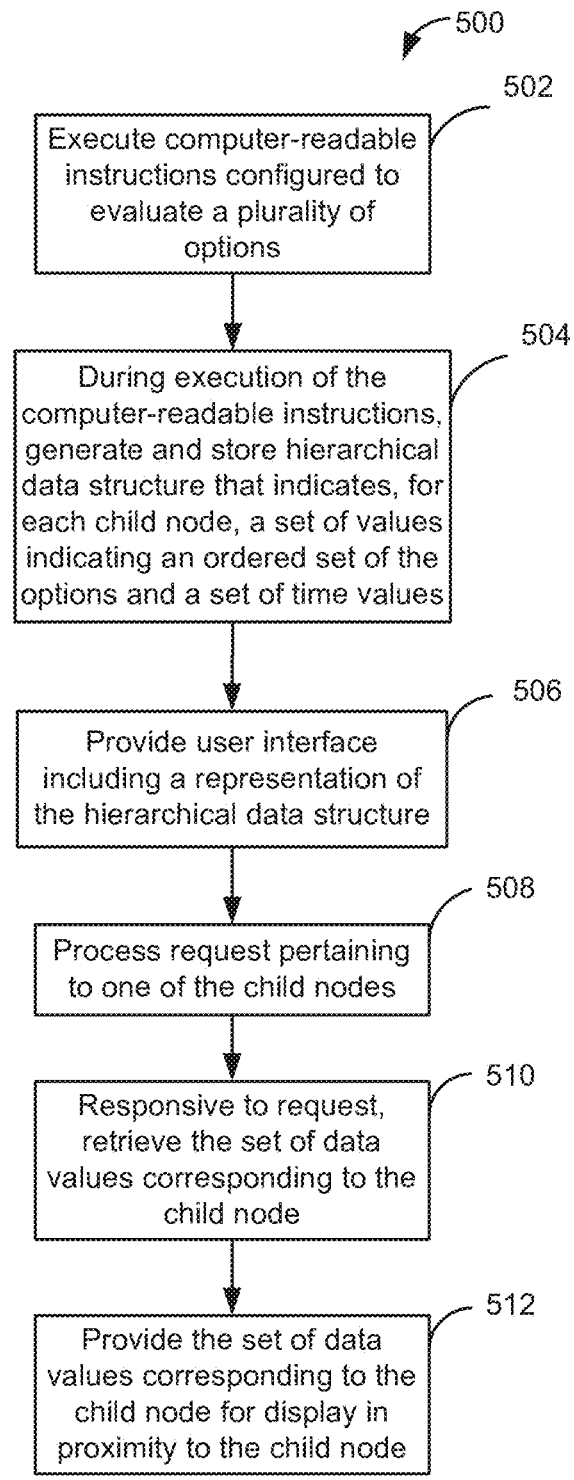
FIG. 5 shows an example of a method 500 for facilitating debug tracing of NBA engine, in accordance with some implementations.

FIG. 5 shows an example of a method 500 for facilitating debug tracing of NBA engine, in accordance with some implementations. Computer-readable instructions configured to evaluate a plurality of options based, at least in part, on input received from a client device are executed at 502, where the input indicates one or more data values. The options can include, for example, solutions to a particular problem, products, services, or offers. In some implementations, the computer-readable instructions are configured to apply a machine learning model to evaluate the plurality of options.

Input can include, for example, a selection of one of a plurality of selectable options, an indication of an identity of a customer, user, or other entity, and/or other criteria to be considered during the evaluation of the options. The criteria can include, for example, problems with a product or service, product/service features desired by a potential buyer, geographical address, and/or budget considerations. For example, a call center employee may submit input during a call with a potential buyer of a product.

During execution of the computer-readable instructions, a hierarchical data structure having a plurality of nodes and indicative of an execution order of the computer-readable instructions is generated and stored at 504. For example, the hierarchical data structure may be generated and stored by debug tracing instructions. In some implementations, the hierarchical data structure includes a tree data structure, where the nodes include a root node and a plurality of child nodes. The root node may store results of executing the NBA strategy engine. Each of the child nodes may store a set of data values obtained as a result of executing a corresponding subset of the computer-readable instructions. A subset of the computer-readable instructions may also be referred to as one or more code modules. Each set of data values may indicate an ordered set of the options generated as a result of executing the corresponding subset of the computer-readable instructions and indicates a set of time values pertaining to execution of the corresponding subset of the computer-readable instructions.

The set of time values may be generated by calculating each of the time values using a system clock. More particularly, a timer may be set at the beginning of execution of a subset of the computer-readable instructions and stopped at the end of execution of the subset of the computer-readable instructions to obtain a CPU time indicating an amount of time that it has taken for processor(s) to execute the corresponding subset of the computer-readable instructions. In addition, a database time indicating an amount of time expended to access data records of at least one database during execution of the corresponding subset of the computer-readable instructions may similarly be ascertained using a system clock. For example, a timer may be set at the beginning of execution of a subset of the computer-readable instructions that accesses a database and stopped upon completion of execution of the subset of the computer-readable instructions An external connection time indicating an amount of time that has been consumed, during execution of the corresponding subset of the computer-readable instructions, to obtain additional data from one or more services offered by one or more external servers may also be obtained using a system clock. For example, a timer may be set at the beginning of execution of a subset of the computer-readable instructions that communicates with an external service and stopped upon receiving data from the external service. In this manner, time values may be obtained for various nodes within the hierarchical data structure.

A user interface is provided for display by the client device, where the user interface includes a representation of the hierarchical data structure at 506. The representation of the hierarchical data structure may include representations of all of the nodes of the hierarchical data structure or only a portion of the nodes of the hierarchical data structure.

A request received from the client device is processed at 508, where the request pertains to a representation of a particular one of the child nodes within the representation of the hierarchical data structure. The request may include an indication of a user interaction with a representation of the particular child node or associated user interface element. For example, the request may be received via an API or URL associated with the representation of the particular child node. Responsive to processing the request received from the client device, the set of data values corresponding to the particular child node is retrieved from the hierarchical data structure at 510 and provided for display by the client device at 512 such that the set of data values is presented within or in proximity to the representation of the particular child node.

In some implementations, a set of data values for a particular child node is generated responsive to the request. In other words, a user may step through execution of the NBA engine during execution of the NBA engine. In other implementations, a set of data values is only retrieved from the hierarchical data structure responsive to the request. In other words, each set of data values is generated and stored prior to providing the user interface.

Although the above-described implementations describe generating and providing a set of data values for specific nodes within a representation of a hierarchical data structure, a summation of data values for various nodes may also be presented. For example, a total CPU time, a total database time, and/or a total connection time may be provided in association with an end or root node of the hierarchical representation. In addition, the time values described herein are merely illustrative. Therefore, different or additional time values may also be generated and presented.

In some but not all implementations, the disclosed methods, apparatus, systems, and computer program products may be configured or designed for use in a multi-tenant database environment. For example, a web page rendered by a browser at a user's client device may include data maintained by a multi-tenant database system. The term "multi-tenant database system" generally refers to those systems in which various elements of hardware and/or software of a database system may be shared by one or more customers. For example, a given application server may simultaneously process requests for a great number of customers, and a given database table may store records, which include rows of data, for a potentially much greater number of customers.

In some implementations, user profiles may be maintained in association with users of the system. An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level networking systems in conjunction with the disclosed techniques.

Figure 6A:
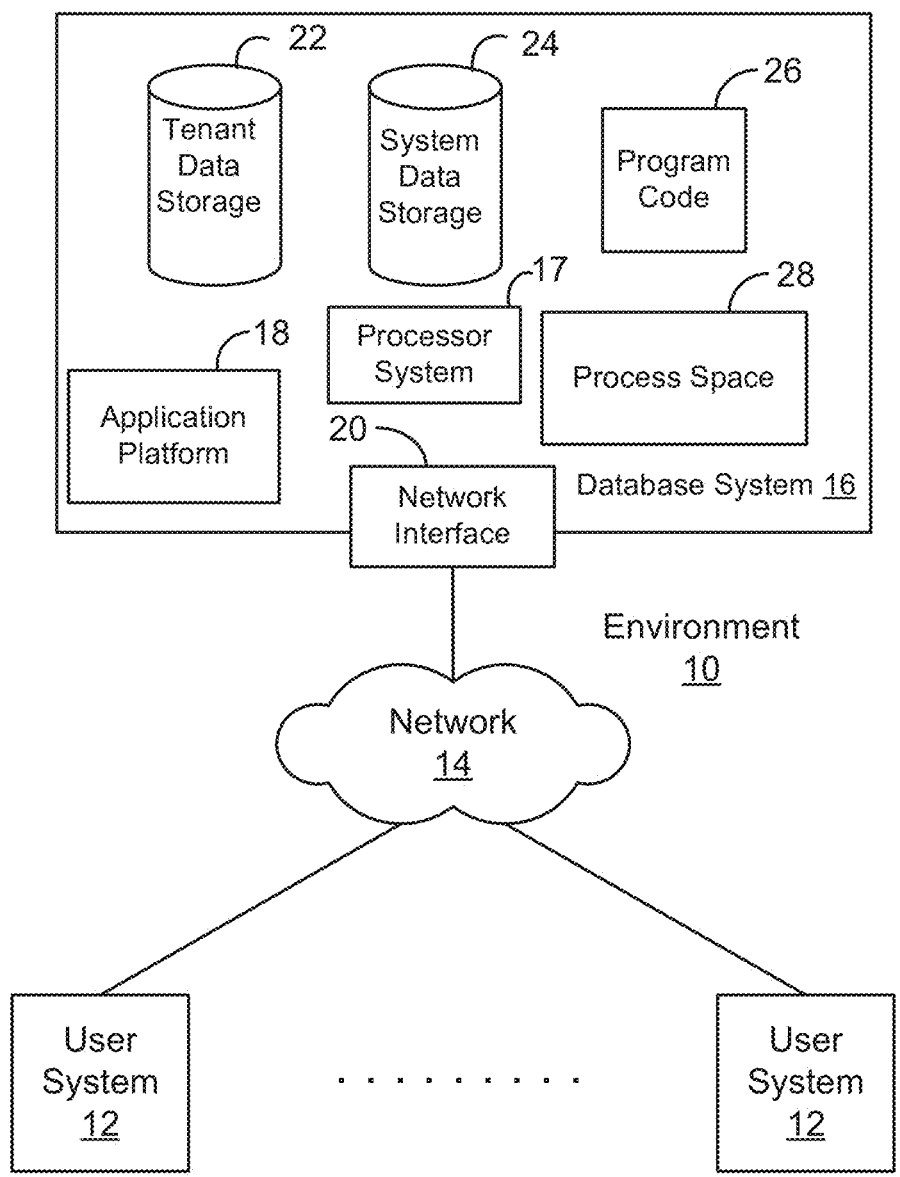
FIG. 6A shows a block diagram of an example of an environment 10 in which an on-demand database service can be used in accordance with some implementations.

FIG. 6A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 6B:
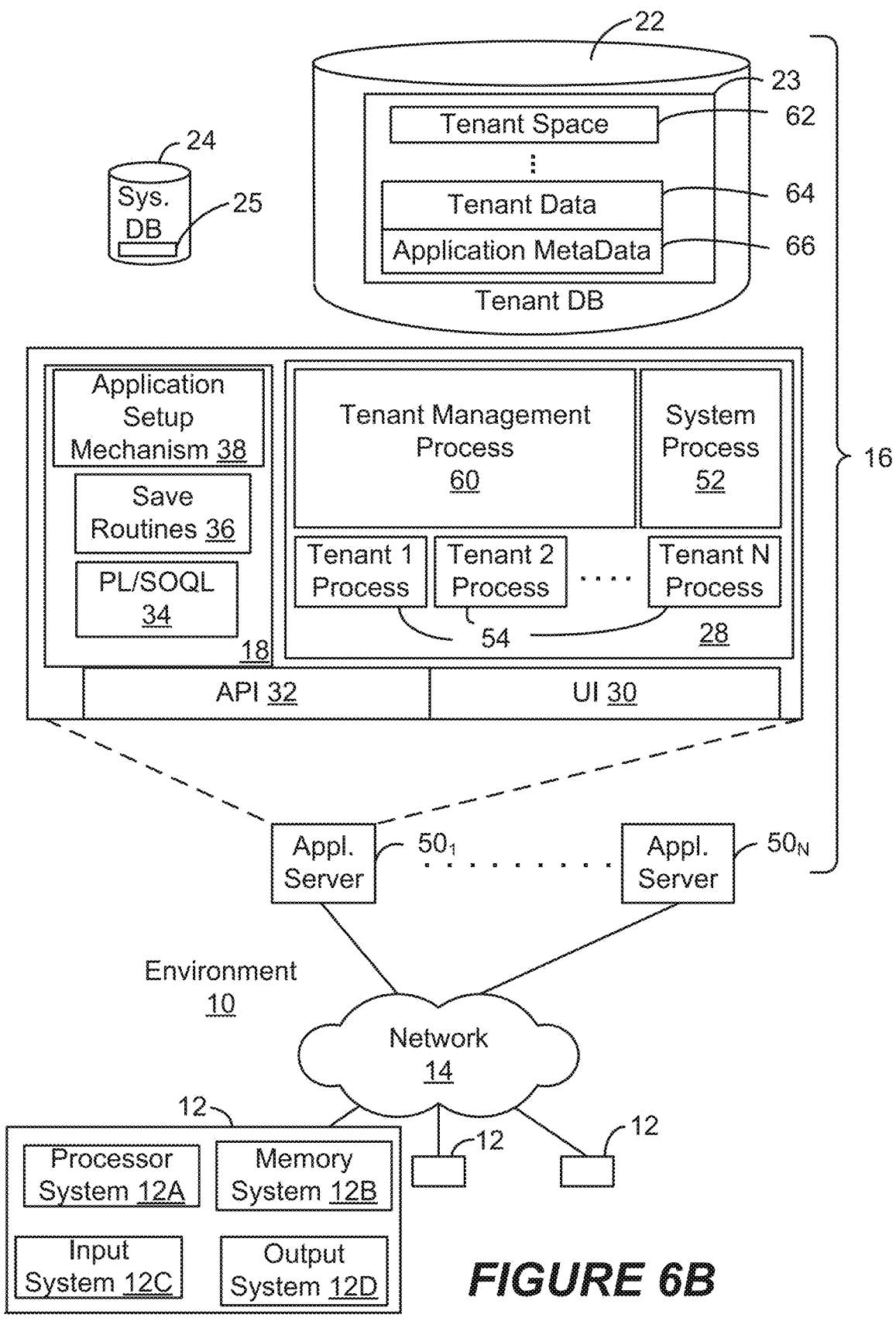
FIG. 6B shows a block diagram of an example of some implementations of elements of FIG. 8A and various possible interconnections between these elements.

One arrangement for elements of system 16 is shown in FIGS. 6A and 6B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, tablet, smartphone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of HTTP application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle databases. Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7A:
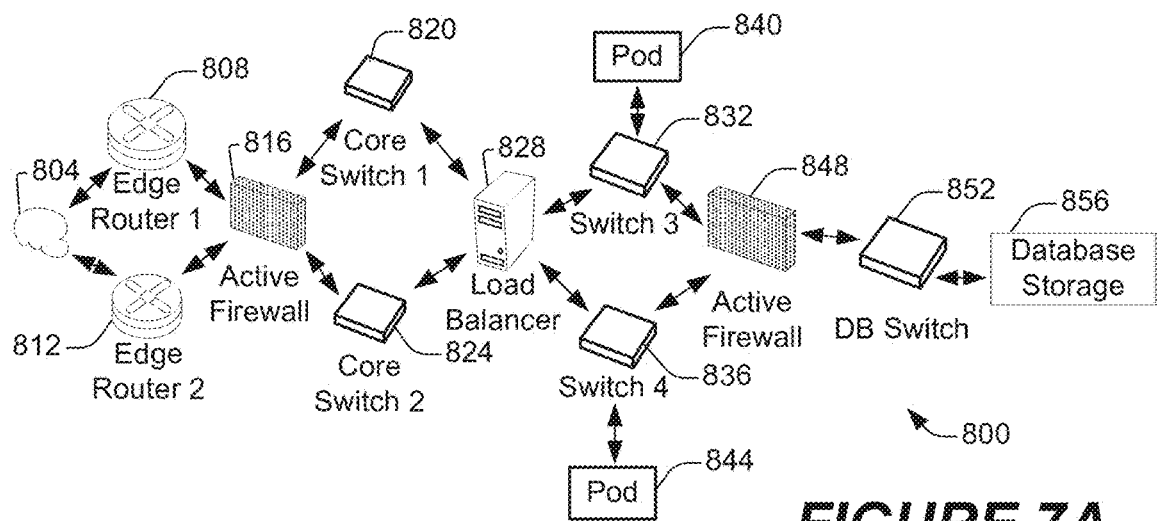
FIG. 7A shows a system diagram of an example of architectural components of an on-demand database service environment 900, in accordance with some implementations.

FIG. 7A shows a system diagram illustrating an example of architectural components of an on-demand database service environment 800 according to some implementations. A client machine located in the cloud 804, generally referring to one or more networks in combination, as described herein, may communicate with the on-demand database service environment via one or more edge routers 808 and 812. A client machine can be any of the examples of user systems 12 described above. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand database service environment may communicate with a database storage 856 via a database firewall 848 and a database switch 852.

Figure 7B:
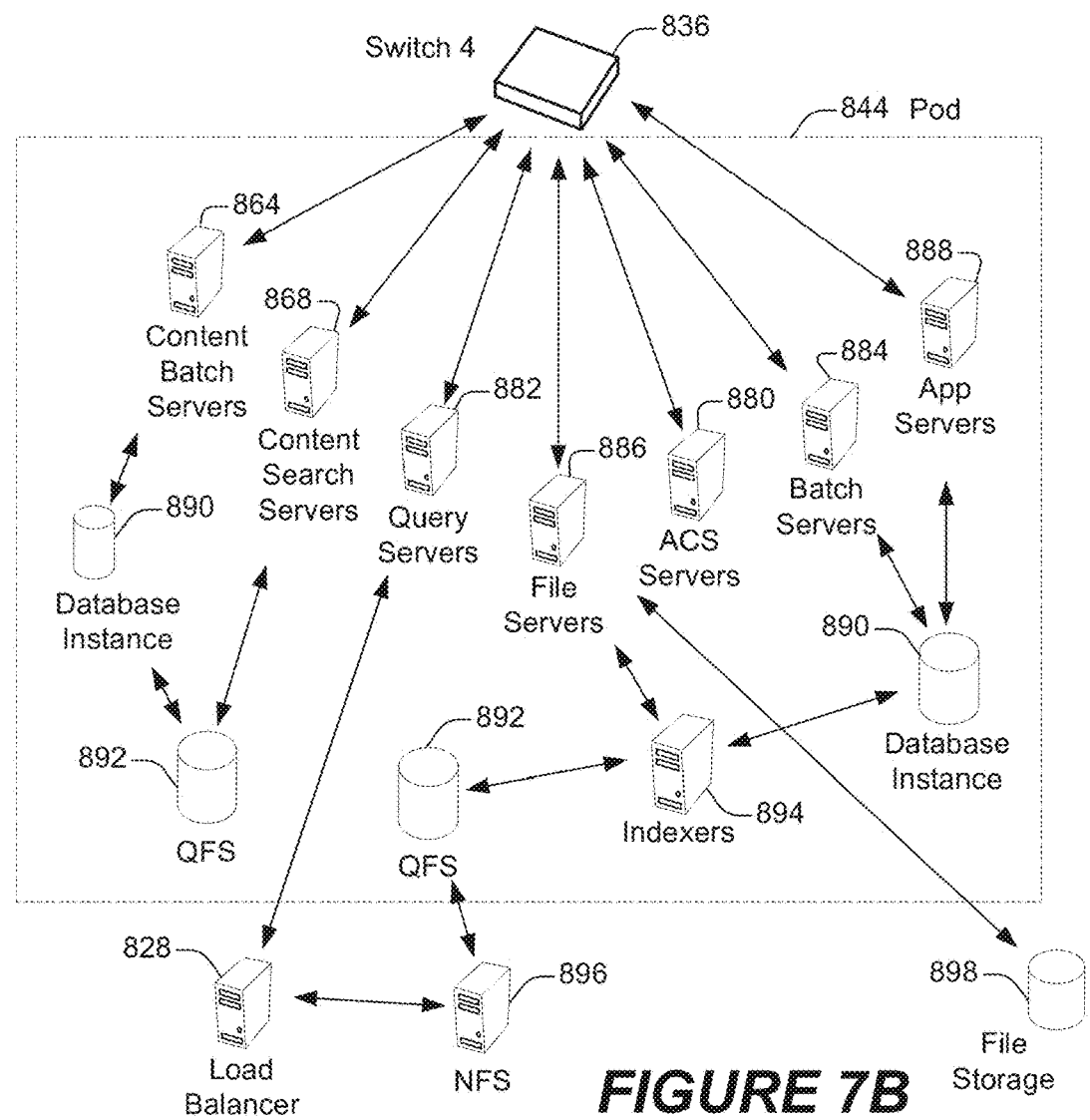
FIG. 7B shows a system diagram further illustrating an example of architectural components of an on-demand database service environment, in accordance with some implementations.

As shown in FIGS. 7A and 7B, accessing an on-demand database service environment may involve communications transmitted among a variety of different hardware and/or software components. Further, the on-demand database service environment 800 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand database service environment to access services provided by the on-demand database service environment. For example, client machines may access the on-demand database service environment to retrieve, store, edit, and/or process information.

In some implementations, the edge routers 808 and 812 route packets between the cloud 804 and other components of the on-demand database service environment 800. The edge routers 808 and 812 may employ the Border Gateway Protocol (BGP). The BGP is the core routing protocol of the Internet. The edge routers 808 and 812 may maintain a table of IP networks or 'prefixes', which designate network reachability among autonomous systems on the Internet.

In one or more implementations, the firewall 816 may protect the inner components of the on-demand database service environment 800 from Internet traffic. The firewall 816 may block, permit, or deny access to the inner components of the on-demand database service environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the on-demand database service environment 800. The core switches 820 and 824 may be configured as network bridges that quickly route data between different components within the on-demand database service environment. In some implementations, the use of two or more core switches 820 and 824 may provide redundancy and/or reduced latency.

In some implementations, the pods 840 and 844 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage 856 may be conducted via the database switch 852. The multi-tenant database storage 856 may include more than one hardware and/or software components for handling database queries. Accordingly, the database switch 852 may direct database queries transmitted by other components of the on-demand database service environment (e.g., the pods 840 and 844) to the correct components within the database storage 856.

In some implementations, the database storage 856 is an on-demand database system shared by many different organizations. The on-demand database system may employ a multi-tenant approach, a virtualized approach, or any other type of database approach. An on-demand database system is discussed in greater detail with reference to FIGS. 7A and 7B.

FIG. 7B shows a system diagram further illustrating an example of architectural components of an on-demand database service environment according to some implementations. The pod 844 may be used to render services to a user of the on-demand database service environment 800. In some implementations, each pod may include a variety of servers and/or other systems. The pod 844 includes one or more content batch servers 864, content search servers 868, query servers 882, file servers 886, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the app servers 888 may include a hardware and/or software framework dedicated to the execution of procedures (e.g., programs, routines, scripts) for supporting the construction of applications provided by the on-demand database service environment 800 via the pod 844. In some implementations, the hardware and/or software framework of an app server 888 is configured to execute operations of the services described herein, including performance of the blocks of methods described with reference to FIGS. 1-4. In alternative implementations, two or more app servers 888 may be included and cooperate to perform such methods, or one or more other servers described herein can be configured to perform the disclosed methods.

The content batch servers 864 may handle requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand database service environment.

The file servers 886 may manage requests for information stored in the File storage 898. The File storage 898 may store information such as documents, images, and basic large objects (BLOBs). By managing requests for information using the file servers 886, the image footprint on the database may be reduced.

The query servers 882 may be used to retrieve information from one or more file systems. For example, the query system 882 may receive requests for information from the app servers 888 and then transmit information queries to the NFS 896 located outside the pod.

The pod 844 may share a database instance 890 configured as a multi-tenant environment in which different organizations share access to the same database. Additionally, services rendered by the pod 844 may call upon various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs. In some implementations, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some implementations, one or more query servers 882 may communicate with the NFS 896 to retrieve and/or update information stored outside of the pod 844. The NFS 896 may allow servers located in the pod 844 to access information to access files over a network in a manner similar to how local storage is accessed.

In some implementations, queries from the query servers 822 may be transmitted to the NFS 896 via the load balancer 828, which may distribute resource requests over various resources available in the on-demand database service environment. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS, it may be available for use by servers within the pod 844 without using an additional database call.

In some implementations, database information may be transmitted to the indexer 894. Indexer 894 may provide an index of information available in the database 890 and/or QFS 892. The index information may be provided to file servers 886 and/or the QFS 892.

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

The tracking and reporting of updates to a record stored in a database system can be facilitated with a multi-tenant database system 16, e.g., by one or more processors configured to receive or retrieve information, process the information, store results, and transmit the results. In other implementations, the tracking and reporting of updates to a record may be implemented at least partially with a single tenant database system.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
   a database system implemented using a server system, the database system configurable to cause:
   executing computer-readable instructions configured to evaluate a plurality of options based, at least in part, on input received from a client device, the input indicating one or more data values;
   during execution of the computer-readable instructions, generating and storing a hierarchical data structure having a plurality of nodes and indicative of an execution order of the computer-readable instructions, the plurality of nodes including a root node and a plurality of child nodes, each of the plurality of child nodes storing a set of data values obtained as a result of executing a corresponding subset of the computer-readable instructions, each set of data values indicating an ordered set of the plurality of options generated as a result of executing the corresponding subset of the computer-readable instructions and indicating a set of time values pertaining to execution of the corresponding subset of the computer-readable instructions;
   providing a user interface for display by the client device, the user interface including a representation of the hierarchical data structure, the representation including a plurality of user interface elements, one or more of the user interface elements representing a corresponding one of the child nodes of the hierarchical data structure;
   processing a request received from the client device, the request pertaining to a particular user interface element, the particular user interface element representing a a first child node of the plurality of child nodes within the representation of the hierarchical data structure;

responsive to processing the request received from the client device, retrieving the set of data values corresponding to the first child node, represented by the particular user interface element, from the hierarchical data structure; and providing for display by the client device, the set of data values such that the set of data values is presented within or in proximity to the particular user interface element.

2. The system as recited in claim 1, the set of time values comprising:

an amount of time that it has taken for one or more processors of the server system to execute the corresponding subset of the computer-readable instructions.

3. The system as recited in claim 1, the set of time values comprising:

an amount of time expended to access data records of at least one database of the database system during execution of the corresponding subset of the computer-readable instructions.

4. The system as recited in claim 1, the set of time values comprising:

an amount of time that has been consumed, during execution of the corresponding subset of the computer-readable instructions, to obtain additional data from one or more services offered by one or more external servers external to the database system.

5. The system as recited in claim 1, the database system further configurable to cause:

calculating, using a system clock, the set of time values.

6. The system as recited in claim 1, the plurality of options representing one or more of: solutions to a particular problem, products, services, or offers.

7. The system as recited in claim 1, the computer-readable instructions configured to apply a machine learning model to evaluate the plurality of options.

8. A computer program product comprising computer-readable program code capable of being executed by one or more processors when retrieved from a non-transitory computer-readable medium, the program code comprising computer-readable instructions configurable to cause:

executing computer-readable instructions configured to evaluate a plurality of options based, at least in part, on input received from a client device, the input indicating one or more data values;

during execution of the computer-readable instructions, generating and storing a hierarchical data structure having a plurality of nodes and indicative of an execution order of the computer-readable instructions, the plurality of nodes including a root node and a plurality of child nodes, each of the plurality of child nodes storing a set of data values obtained as a result of executing a corresponding subset of the computer-readable instructions, each set of data values indicating an ordered set of the plurality of options generated as a result of executing the corresponding subset of the computer-readable instructions and indicating a set of time values pertaining to execution of the corresponding subset of the computer-readable instructions;

providing a user interface for display by the client device, the user interface including a representation of the hierarchical data structure, the representation including a plurality of user interface elements, one or more of the user interface elements representing a corresponding one of the child nodes of the hierarchical data structure;

processing a request received from the client device, the request pertaining to a particular user interface element, the particular user interface element representing a first child node of the plurality of child nodes within he representation of the hierarchical data structure;

responsive to processing the request received from the client device, retrieving the set of data values corresponding to the first child node, represented by the particular user interface element, from the hierarchical data structure; and providing for display by the client device, the set of data values such that the set of data values is presented within or in proximity to the particular user interface element.

9. The computer program product as recited in claim 8, the set of time values comprising:

an amount of time that it has taken for one or more processors to execute the corresponding subset of the computer-readable instructions.

10. The computer program product as recited in claim 8, the set of time values comprising:

an amount of time expended to access data records of at least one database during execution of the corresponding subset of the computer-readable instructions.

11. The computer program product as recited in claim 8, the set of time values comprising:

an amount of time that has been consumed, during execution of the corresponding subset of the computer-readable instructions, to obtain additional data from one or more services offered by one or more external servers.

12. The computer program product as recited in claim 8, the program code comprising instructions further configured to cause:

calculating, using a system clock, the set of time values.

13. The computer program product as recited in claim 8, the plurality of options representing one or more of: solutions to a particular problem, products, services, or offers.

14. A method, comprising:

executing, by one or more servers, computer-readable instructions configured to evaluate a plurality of options based, at least in part, on input received from a client device, the input indicating one or more data values;

during execution of the computer-readable instructions, generating and storing, by the one or more servers, a hierarchical data structure having a plurality of nodes and indicative of an execution order of the computer-readable instructions, the plurality of nodes including a root node and a plurality of child nodes, each of the plurality of child nodes storing a set of data values obtained as a result of executing a corresponding subset of the computer-readable instructions, each set of data values indicating an ordered set of the plurality of options generated as a result of executing the corresponding subset of the computer-readable instructions and indicating a set of time values pertaining to execution of the corresponding subset of the computer-readable instructions;

providing a user interface for display by the client device, the user interface including a representation of the hierarchical data structure, the representation including a plurality of user interface elements, one or more of the user interface elements representing a corresponding one of the child nodes of the hierarchical data structure;

processing a request received from the client device, the request pertaining to a particular user interface element, the particular user interface element representing a first child node of the plurality of child nodes within the representation of the hierarchical data structure;

responsive to processing the request received from the client device, retrieving the set of data values corresponding to the first child node, represented by the particular user interface element, from the hierarchical data structure; and providing for display by the client device, the set of data values such that the set of data values is presented within or in proximity to the particular user interface element.

15. The method as recited in claim 14, the set of time values comprising:

an amount of time that it has taken for one or more processors to execute the corresponding subset of the computer-readable instructions.

16. The method as recited in claim 14, the set of time values comprising:

an amount of time expended to access data records of at least one database during execution of the corresponding subset of the computer-readable instructions.

17. The method as recited in claim 14, the set of time values comprising:

an amount of time that has been consumed, during execution of the corresponding subset of the computer-readable instructions, to obtain additional data from one or more services offered by one or more external servers.

18. The method as recited in claim 14, further comprising:

calculating by the servers, using a system clock, the set of time values.

19. The method as recited in claim 14, the plurality of options representing one or more of: solutions to a particular problem, products, services, or offers.

20. The method as recited in claim 14, the computer-readable instructions configured to apply a machine learning model to evaluate the plurality of options.

21. The method as recited in claim 14, the first child node corresponding to a decision point of a next best action (NBA) engine implemented by the computer-readable instructions.

22. The method as recited in claim 14, the particular user interface element being one of the one or more user interface elements.

* * * * *